3,123,563
LUBRICATING OIL COMPOSITION

Guy M. Verley, Harvey, Ill., assignor, by mesne assignments, to Sinclair Research Inc., New York, N.Y., a corporation of Delaware
No Drawing. Filed Sept. 28, 1960, Ser. No. 58,893
4 Claims. (Cl. 252—35)

This invention relates to a lubricating oil composition of improved detergent characteristics. More particularly this invention relates to lubricating oils containing a novel class of detergent macromolecules that are excellent sludge inhibitors and dispersants.

Polymers of unsaturated acid esters as, for instance, certain of the methacrylate polymers are known to be good pour depressors and viscosity index improvers for lubricating oils. These polymers, however, are usually poor sludge inhibitors and poor sludge peptizers, a characteristic which in many cases, precludes their use.

It has now been discovered that the addition of selected metals to polymers of unsaturated acid esters affords excellent detergent additives. The detergent additive of the present invention is an oil-soluble, partial metal salt of an oil-soluble polymer of an alkene monocarboxylic acid ester.

The metal (including metalloid) forming the salt of the present invention is selected from the group consisting of the divalent states of beryllium, cobalt and nickel; the tri-valent states of arsenic, antimony and bismuth; and the tetra-valent states of titanium, zirconium and tin. The metal may also be substituted as, for example, with oxygen, hydroxyl, sulfhydryl, alkyl aryl, alkoxy or other hydrocarbon radicals or a combination thereof. The presence of substituents may depend, of course, on the valence of the metal. The polymer can contain besides carbon and hydrogen, other elements such as oxygen, sulfur, nitrogen and chlorine.

The unsaturated acid polymers which can be utilized to prepare the detergent additives of the present invention generally have an average molecular weight of about 200 to 100,000 preferably about 10,000 to 60,000 and can contain COOR groups or both COOR and COOH groups, the latter perhaps being due to hydrolysis. Any method known to the art may be used to prepare the polymers of unsaturated acid esters of the present invention. Among the methods generally available for the preparation of my additives are the following:

(1) copolymerization of an ester of a terminal double bond ($>$C$=$C$<$) containing monocarboxylic aliphatic acid with the proper salt of a terminal double bond ($>$C$=$C$<$) containing aliphatic monocarboxylic acid, (2) copolymerization of an ester of a terminal double bond ($>$C$=$C$<$) containing monocarboxylic aliphatic acid with a terminal double bond ($>$C$=$C$<$) containing aliphatic acid followed by direct salt formation, (3) partial hydrolysis of a polymer of an ester of a terminal double bond ($>$C$=$C$<$) containing aliphatic acid followed by salt formation with the proper inorganic salt. The reactants in the above copolymerization reactions are in molar quantities that provide or maintain sufficient ester groups in the final polymer to render the polymer oil-soluble. Generally the mole ratio of ester (—COOR) to salt (—COOMe) is at least about 3:1, e.g. about 3 to 20:1, preferably about 8 to 12:1. The symbol Me represents a stoichiometric equivalent of the metal. Of the three above methods, partial hydrolysis (method 3) is preferred because it is most convenient. In this method the extent of hydrolysis is that which leaves sufficient ester radicals to keep the polymers oil-soluble. Although esters of the various alkene monocarboxylic acids can be polymerized, the acids are usually of about 3 to 8 or more carbon atoms and have a terminal double bond.

Advantageous polymers for use in preparing the additive of the present invention are the polymers of an alkyl acrylate which are predominantly of branched linear polymer chains. The polymers may be homopolymers such as polymethacrylates, copolymers of more than one of the alkyl acrylates, or interpolymers of one or more than one alkyl acrylates with one or more than one other copolymerizable carbon to carbon unsaturated organic monomers, preferably monoolefinic monomers such as vinyl chloride, vinylidine chloride, etc. The hydrocarbon alcohol residue (R of the alcohol ROH) generally has an average of about 6 to 20 carbon atoms, preferably about 8 to 16. Particularly advantageous polymers for use in preparing the additives of the present invention are polymerized esters of alpha-methacrylic acid or acrylic acid and monohydric aliphatic alcohols having at least 6 carbon atoms, preferably about 8 to 16 carbon atoms per molecule or more. A series of commercially available polymers of this type are known as the "Acryloids." Their chemical structure may be represented as:

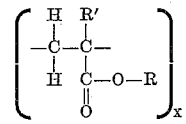

where R is an alkyl radical of about 6 to 18 carbon atoms on the average such as cetyl, lauryl or octyl; R' is H or methyl, and x is the number of molecules of similar structure condensed together to form a high molecular weight polymer, preferably of about 10,000 to 100,000 molecular weight. The "Acryloids" are clear viscous concentrates of methacrylate polymer in solvent refined neutral oil. The usual concentration is about 40 weight percent. "Acryloid 618" is particularly useful for purposes of this invention. "Acryloid 618" is a commercial lauryl methacrylate polymer having molecular weights of about 20,000 to 60,000 (40% concentrate in mineral oil).

In accordance with the preferred method of producing the additive of the present invention, the polymer of unsaturated acid esters, as for instance, the polymethacrylates are partially hydrolyzed and then followed by salt formation employing the defined metal or metalloid salts of inorganic acids. Particularly preferred inorganic salts are the chlorides and nitrates.

The hydrolysis of the polymer of unsaturated acid esters is carried out in solution by first dissolving the polymer in a suitable solvent such as methyl alcohol, benzene, methyl ethyl ketone, acetone, oils of lubricating viscosity, etc., to make a dilute solution usually containing from about 0.5 to 20% by weight polymer, preferably about 2 to 10% by weight. To the dilute polymer in a vessel is added a suitable hydrolysis agent, the vessel then is closed and the mixture refluxed for the desired interval of time. The temperatures employed will depend on the reflux temperature of the solvent used. The solvents are then topped off at reduced pressure. If an alkaline hydrolysis agent is employed the resulting polymer will be in the alkaline metal salt form, that is, will contain (—COOM) groups wherein M is the alkaline metal of the alkaline hydrolysis agent.

To form the additive of the present invention a stoichiometric equivalent of the select metal or metalloid inorganic salt, dissolved in a suitable solvent such as methanol, corresponding to the alkaline metal present in the alkaline salt of the polymer is then added and the mixture heated at a temperature of about 30 to 100° C. The solvent is topped off, the mixture cooled and a hydrocarbon such as hexane added to increase the rate of settling of the alkaline inorganic salt which has formed. The alkaline inorganic salt is settled and filtered from the mixture, the hydrocarbon is removed and the metal or metalloid salt of the polymer is obtained.

Suitable alkaline hydrolysis agents include the alkali hydroxides such as sodium, potassium and ammonium hydroxides and the quaternary ammonium bases such as cetyl dimethyl ammonium hydroxide, salts of a strong base and a weak acid such as sodium bicarbonate, sodium carbonate, sodium silicate, sodium oxalate, sodium lactate and others. The strongly alkaline hydroxides including ammonium hydroxide are particularly preferred for the hydrolysis.

Although it is preferred to conduct the hydrolysis utilizing an alkaline hydrolysis agent, acid hydrolysis agents may also be employed if desired. If acid hydrolyzing agents are employed the resulting polymer will contain free carboxyl groups (—COOH). The additive of the present invention is then formed by reacting the select metal or metalloid salt with the carboxyl-group-containing polymer.

The amount of hydrolyzing agent utilized in the hydrolysis reaction will be an amount sufficient to hydrolyze on the average about $1/20$ to $1/3$ of the ester groups present in the polymer mixture. Preferably, an amount of hydrolyzing agent sufficient to hydrolyze on the average of about one ester group of each 8 to 12 ester groups present in the polymer mixture is employed. The actual number of ester groups hydrolyzed may depend on the particular hydrolyzing agent employed and the total number of ester radicals contained in the polymer. It is found, in general, when employing the strong alkaline hydrolyzing agents such as potassium and sodium hydroxide in the hydrolysis of polymethacrylates, an amount of about 0.5 to 10% by weight usually about 1 to 5% based on the polymer is sufficient.

The oil base stock improved by the inclusion of the novel additives of the present invention is of lubricating viscosity and can be, for instance, a solvent extracted or solvent refined mineral oil obtained in accordance with conventional methods of solvent refining petroleum lubricating oils. Generally, lubricating oils have viscosities from about 20 to 250 SUS at 210° F. The base oil may be derived from paraffinic, naphthenic, asphaltic or mixed base crudes, and if desired, a blend of solvent-treated Mid-Continent neutrals and Mid-Continent bright stocks may be employed. Synthetic hydrocarbon oils, for instance, of the alkylene polymer type or those derived from coal and shale may also be employed. Alkylene oxide polymers and their derivatives such as the propylene oxide polymers and their ethers and esters in which the terminal hydroxyl groups have been modified are also suitable. Synthetic oil of the dicarboxylic acid ester type including dibutyl adipate, di-2-ethyl-hexyl sebacate, di-n-hexyl fumarate polymer, di-lauryl azelate, and the like may be used. Alkyl benzene types of synthetic oils such as tetradecyl benzene, etc., are also included.

The additives of the present invention are added to the base oil in amounts sufficient to improve the detergent characteristics of the oil. Generally the amounts utilized will be about 0.2 to 10 weight percent, preferably about 1 to 5 weight percent.

The following examples will serve to more fully describe the present invention.

EXAMPLE I

Acryloid 618 was dissolved in 1350 g. of a Mid-Continent refined lubricating oil of 95 VI and 150 SUS at 100° F. viscosity to obtain a 4 weight percent solution of polymer. A solution of 3.3 g. of potassium hydroxide in 10 g. of water and 100 g. of methanol was prepared. About one ester group of each 10 ester groups present in the polymer was hydrolyzed by adding the potassium hydroxide solution to the polymer solution, refluxing with stirring for 1 hour then topping the solvents up to 180° C. at reduced pressure. Acryloid 618 is a commercial lauryl methacrylate polymer of 20,000–60,000 mole weight.

One equivalent of copper chloride $CuCl_2 \cdot 2H_2O$ (0.33 g.) was dissolved in methanol and added to 100 g. of the potassium salt solution of Acryloid 618 prepared earlier. The methanol was topped, with good stirring, up to 150° C. pot temperature, then 200 g. of hexane added after cooling to 50° C. After settling and filtering the white precipitate of potassium chloride, the copper salt was freed of hexane by topping.

All metal salts in the following example were prepared in a similar manner, using the stoichiometric amount of metal chloride corresponding to the potassium present in the potassium salt. All metal salts were clear after settling of the white precipitate.

EXAMPLE II

Various partial salts of Acryloid 618 were prepared in a manner similar to Example I. About 4 weight percent of each of the partial salts was added to a Mid-Continent neutral oil having a viscosity SUS at 100° F. of 206.3, and a viscosity index of 95.6 and the compositions were subjected to a detergency test. At the end of the test the oil is rated visually for cleanliness, the deposited sludge is weighed and acid number and pentane insolubles are determined. After 10 days of standing the appearance of the oil and the redispersibility of the sludge are noted.

The results of the tests are shown in Tables I through VI. In the tables, column (1) gives the visual rating. Column (2) gives the weight of oil-less sludge adhering to the test container after hexane washing. Column (3) gives pentane insolubles which are an indication of the weight of sludge peptized. Column (4) gives the acid number which is a measure of test severity. Column (5) gives the total weight of sludge which is an indirect measure of inhibition when compared with the total weight of sludge formed in the base oil; total weight of sludge is the weight of sludge deposited on the test container plus the weight of sludge peptized in the used oil. Column (6) gives the total weight of sludge corrected to the same test severity of 5 acid number. Column (7) gives the appearance of the used oil after 10 days of standing. The best detergents should peptize sludge for at least this period of time.

*Table I*

DETERGENCY OF PARTIAL SALTS OF ACRYLOID 618 METALS OF GROUPS I-A AND II-A

| Detergent | (1) Visual Rating | (2) Wt. of Sludge | (3) Pentane Insol. | (4) Acid No. | (5) Total Wt. of Sludge | (6) Total Wt. Sludge Corrected to 5 Ac. No. | (7) Appearance at 10 days of Standing |
|---|---|---|---|---|---|---|---|
| Base Oil | 20 | 2.72 | 0.020 | 5.44 | 2.72 | 2.50 | Clear. |
| Acryloid 618 | 60 | 1.57 | 0.210 | 3.84 | 1.71 | 2.05 | Do. |
| 5% K salt | 80 | 0.11 | 1.344 | 3.65 | 1.05 | 1.40 | Emulsion. |
| 5% Be salt | 83 | 0.13 | 0.952 | 6.16 | 0.79 | 0.50 | Do. |
| 5% Mg salt | 47 | 3.40 | 0.10 | 5.01 | 3.47 | 3.50 | Clear. |
| 5% Ca salt | 73 | 0.69 | 1.191 | 7.43 | 1.53 | 0.70 | Do. |
| 5% Sr salt | 42 | 3.76 | 0.383 | 7.17 | 4.02 | 3.10 | Do. |
| 5% Ba salt | 56 | 2.23 | 0.062 | 5.06 | 2.27 | 2.15 | Do. |

Table I shows the effect of alkaline and alkaline earth metal substitution. The potassium salt of Acryloid 618 peptizes sludge very well to form a stable emulsion but lacks inhibiting power. The group II—A salts, except for beryllium, do not sufficiently improve the detergency of Acryloid 618. The beryllium salt is shown to be both a good peptizer and a good inhibitor.

Table II
DETERGENCY OF PARTIAL SALTS OF ACRYLOID 618 METALS OF GROUPS I-B AND II-B

| Detergent | (1) R | (2) Sl. | (3) P. Insol. | (4) Acid No. | (5) T. Sl. | (6) C.T. Sl. | (7) 10 Days Appearance |
|---|---|---|---|---|---|---|---|
| Base Oil | 20 | 2.72 | 0.020 | 5.44 | 2.72 | 2.50 | Clear. |
| Acryloid 618 | 60 | 1.57 | 0.210 | 3.84 | 1.71 | 2.05 | Do. |
| I-B. 5% Cu Salt | 60 | 3.69 | 0.119 | 5.35 | 3.77 | 3.25 | Do. |
| II-B. 5% Zn Salt | 53 | 1.36 | 0.325 | 5.41 | 1.58 | 1.20 | Hazy. |
| 5% Hg Salt | 47 | 3.60 | 0.116 | 5.78 | 3.68 | 3.25 | Clear. |

The data of Table II demonstrates that the metals of group I–B, copper, and group II–B, zinc and mercury, do not improve sufficiently the detergency of Acryloid 618. Copper and mercury are shown to be sludge promoters.

Table III
DETERGENCY OF PARTIAL SALTS OF ACRYLOID 618 TRANSITION METALS AND MISCELLANEOUS

| Detergent | (1) R | (2) Sl. | (3) P. Insol. | (4) Acid No. | (5) T. Sl. | (6) C.T. Sl. | (7) 10 Days Appearance |
|---|---|---|---|---|---|---|---|
| Base Oil | 20 | 2.72 | 0.020 | 5.44 | 2.72 | 2.50 | Clear. |
| Acyloid 618 | 60 | 1.57 | 0.210 | 3.84 | 1.71 | 2.05 | Do. |
| 5% Fe (ic) salt | 63 | 1.72 | 0.007 | 4.58 | 1.72 | 1.90 | Do. |
| 5% Co (ous) salt | 93 | 0.08 | 0.217 | 4.83 | 0.25 | 0.30 | Hazy. |
| 5% Ni (ous) salt | 87 | 0.08 | 0.892 | 3.89 | 0.70 | 0.90 | Do. |
| 5% Mn salt | 30 | 1.45 | 0.055 | 8.07 | 1.49 | 0.60 | Do. |
| 5% Mo salt | 63 | 3.11 | 0.041 | 4.09 | 3.14 | 3.50 | Clear. |
| 5% V salt | 60 | 1.65 | 0.061 | 4.14 | 1.69 | 2.00 | Do. |
| 5% Ce salt | 95 | 1.65 | 0.252 | 3.76 | 1.81 | 2.10 | Do. |
| 5% Pb salt | 47 | 4.62 | 0.019 | 5.54 | 4.63 | 4.50 | Do. |

Table III shows that certain metals of the first transition series improve Acryloid 618 when they are in a low valency state. Cobaltous is excellent, imparting the greatest inhibition among all metals tested. Nickelous is good and may be of special interest for its anti-wear qualities. Molybdenum and lead and cerium are sludge promoters. Cerium, a member of the rare earth group, displays the odd property of forming a gritty sludge which does not adhere to the test tube, hence the high cleanliness rating of 95.

Table IV
DETERGENCY OF PARTIAL SALTS OF ACRYLOID 618 METALS OF GROUPS IV AND V

| Detergent | (1) R | (2) Sl. | (3) P. Insol. | (4) Acid No. | (5) T. Sl. | (6) 6 Days Appearance |
|---|---|---|---|---|---|---|
| Base Oil | 20 | 2.72 | 0.020 | 5.44 | 2.72 | Clear. |
| Acryloid 618 | 60 | 1.57 | 0.210 | 3.84 | 1.71 | Do. |
| Group IV: | | | | | | |
| 5% Ti (Cl₃)* salt | 61 | 4.52 | 0.007 | 5.24 | 4.52 | Clear. |
| 5% Ti (Cl₄)* salt | 95 | 0.05 | 0.871 | 4.58 | 0.61 | Emulsion. |
| 5% Zr (Cl₄)* salt | 95 | 0.08 | 0.521 | 4.19 | 0.44 | Cloudy. |
| 5% Sn (Cl₄)* salt | 67 | 0.10 | 0.087 | 5.30 | 0.16 | Hazy. |
| Group V: | | | | | | |
| 5% As (Cl₃)* salt | 88 | 0.13 | 1.217 | 5.22 | 0.97 | Emulsion. |
| 5% Sb (Cl₃)* salt | 94 | 0.12 | 1.262 | 5.92 | 1.00 | Do. |
| 5% Bi (Cl₃)* salt | 82 | 0.05 | 1.202 | 5.62 | 0.89 | Do. |

*Metal added in this form.

Table IV shows that titanium and zirconium impart excellent detergency to Acryloid 618. Addition of these metals may also be of value to impart specific anti-wear properties. Tin is shown as having the opposite effect to that of cerium. Tin sludge does not polymerize to a viscous resin but remains a mobile liquid decanting rapidly at room temperature. About 0.10 g. of resinous sludge and 2.2 g. of liquid were smeared on the test container walls, giving it, a low rating. Tin, however, is shown to be a good sludge inhibitor and a fair peptizer.

Metalloids of group V are seen as imparting great peptizing power to Acryloid 618. They also decrease sludge formation by about half. These metalloids are powerful catalyst poisons for the oxidation of $SO_2$ into $SO_3$ in the presence of vanadium oxides. Their presence in crankcase oils may increase performance greatly in diesel engines when fuel sulfur is a major cause of engine deposits.

*Table V*

DETERGENCY OF PARTIAL SALTS OF ACRYLOID 618 ORGANO METALS SUBSTITUENTS

| Detergent | (1) R | (2) Sl. | (3) P. Insol. | (4) Acid No. | (5) T. Sl. | (6) C.T. Sl. | (7) 10 Days Appearance |
|---|---|---|---|---|---|---|---|
| Base Oil | 20 | 2.72 | 0.020 | 5.44 | 2.72 | 2.50 | Clear. |
| Acryloid 618 | 60 | 1.57 | 0.210 | 3.84 | 1.71 | 2.05 | Do. |
| $(C_4H_9)_3$ Sn— | 83 | 0.13 | 0.919 | 6.45 | 0.82 | 0.30 | Emulsion. |
| ($\phi$-$CH_2$)$_3$ Sn— | 87 | 0.10 | 0.828 | 8.00 | 0.67 | 0.05 | Do. |
| $(C_8H_{17})_2$ Sn= | 80 | 0.37 | 0.947 | 6.32 | 1.03 | 0.60 | Cloudy. |
| $\phi_2$-Sn= | 99 | 0.01 | 0.442 | 4.21 | 0.31 | 0.50 | Emulsion. |

Table V demonstrates that the detergency of Acryloid 618 can be improved by substitution with stable organic-metallic compounds. All the organo-tin compounds tried resulted in increased detergency and inhibition, tribenzyl tin and diphenyl tin being exceptionally good. It seems that aromatic substitution is preferable to alkyl substitution. The data also shows that increasing the size of the alkyl group is beneficial. Generally the organo groups are hydrocarbon radicals of up to about 20 carbon atoms, preferably 4 to 18.

*Table VI*

DETERGENCY OF PARTIAL SALTS OF NITROGEN CONTAINING ACRYLOID ORGANO-TIN SUBSTITUENTS

| Detergent | (1) R | (2) Sl. | (3) P. Insol. | (4) Acid No. | (5) T. Sl. | (6) C.T. Sl. | (7) 10 Days Appearance |
|---|---|---|---|---|---|---|---|
| Base Oil | 20 | 2.72 | 0.020 | 5.44 | 2.72 | 2.50 | Clear. |
| Acryloid 618 | 60 | 1.57 | 0.210 | 3.84 | 1.71 | 2.05 | Do. |
| LM—PMAA | 85 | 0.12 | 1.436 | 5.74 | 1.12 | 0.90 | Cloudy. |
| K | 95 | 0.12 | 1.202 | 4.74 | 0.96 | 1.00 | Do. |
| $(C_4H_9)_3$ Sn— | 97 | 0.06 | 0.977 | 4.90 | 0.74 | 0.80 | Emulsion. |
| $(C_8H_{17})_2$ Sn= | 98 | 0.02 | 0.764 | 3.98 | 0.55 | 0.90 | Do. |
| ($\phi CH_2$)$_3$ Sn— | 99 | 0.01 | 0.446 | 3.59 | 0.32 | 0.80 | Do. |
| $\phi_2$SN= | 98 | 0.03 | 0.893 | 3.54 | 0.65 | 1.20 | Do. |

Table VI shows that addition of organo-tin to a copolymer (LM—PMAA) of 1 part propylmorpholine acrylic amide with 20 parts lauryl methacrylate improves detergency further.

I claim:

1. A lubricating oil composition of improved detergent characteristics which consists essentially of an oil of lubricating viscosity and a minor amount sufficient to provide the oil with improved detergent characteristics, of an oil-soluble partial salt of an oil-soluble polymer of terminally unsaturated alkene monocarboxylic acid ester, the acid group of said acid ester having about 3 to 8 carbon atoms, the ester group of said acid ester having about 6 to 20 carbon atoms, said partial salt containing a ratio of ester groups to metal salt groups of about 3 to 20:1, the metal forming said partial salt being selected from the group consisting of the divalent states of nickel, cobalt, and beryllium; the trivalent states of arsenic, antimony and bismuth; and the tetravalent states of titanium, zirconium and tin.

2. The composition of claim 1 wherein the lubricating oil is a mineral oil.

3. The composition of claim 2 wherein the additive is the partial salt of a methacrylate polymer having a molecular weight of about 10,000 to 60,000.

4. The composition of claim 3 wherein the partial salt is about 1 to 5% of the composition.

References Cited in the file of this patent

UNITED STATES PATENTS

| 2,280,475 | Byrkit et al. | Apr. 21, 1942 |
| 2,316,085 | Kelso et al. | Apr. 6, 1943 |
| 2,489,281 | Foehr | Nov. 29, 1949 |
| 2,737,494 | Frank | Mar. 6, 1956 |